United States Patent [19]

Corle et al.

[11] Patent Number: 5,067,805

[45] Date of Patent: Nov. 26, 1991

[54] CONFOCAL SCANNING OPTICAL MICROSCOPE

[75] Inventors: Timothy R. Corle, Palo Alto; Chester L. Mallory, Campbell; Philip D. Wasserman, Cupertino, all of Calif.

[73] Assignee: Prometrix Corporation, Santa Clara, Calif.

[21] Appl. No.: 485,596

[22] Filed: Feb. 27, 1990

[51] Int. Cl.$^5$ .................. G02B 26/02; G02B 5/04; G02B 21/06

[52] U.S. Cl. ....................... 359/235; 359/368; 359/386; 359/638; 359/833

[58] Field of Search ............... 350/523-528, 350/534, 535, 6.3, 6.8, 445, 507-513, 286-287, 271-274

[56] References Cited

U.S. PATENT DOCUMENTS

| | | | |
|---|---|---|---|
| 3,517,980 | 6/1970 | Petran et al. | 350/527 |
| 3,926,500 | 12/1975 | Frosch et al. | 350/527 |
| 4,030,817 | 6/1977 | Westell | 350/448 |
| 4,802,748 | 2/1989 | McCarthy et al. | 350/507 |
| 4,884,881 | 12/1989 | Lichtman et al. | 350/527 |
| 4,896,952 | 1/1990 | Rosenbluth | 350/445 |
| 4,917,478 | 4/1990 | Petrán et al. | 350/527 |
| 4,927,254 | 5/1990 | Kino et al. | 350/527 |

OTHER PUBLICATIONS

M. Petran, et al., "The Tandem Scanning Reflected Light Microscope" (Petran I); The Tandem Scanning Reflected Light Microscope-Part 1-the Principle and Design (Petran II), Journal of Scanning Electron Microscopy and Related Methods, Proceedings RMS, vol. 20/3, May 1985 (pp. 125-139).

Q. C. Xiao, et al., "Real-time Confocal Scanning Optical Microscope," Applied Phys., vol. 53, No. 8, (Aug. 22, 1988), pp. 716-718.

G. S. Kino, et al., "Imaging Theory for the Scanning Optical Microscope", FIG. 2, G. L. Report No. 4405, Sep. 1988.

G. S. Kino, et al., "The Scanning Optical Microscope: an Overview", FIG. 3, p. 35, SPIE, vol. 897, Scanning Microscopy Technologies and Applications (1988).

G. S. Kino, et al., "New Types of Scanning Optical Microscopes", FIG. 1, SPIE Vol. 921 Integrated Circuit Metrology, Inspection, and Process Control 11 (1988).

G. S. Kino, et al., "Confocal Scanning Optical Microscopy", Fig. 4, Physics Today, Sep. 1989.

T. R. Corle, et al., "Characterization of a Real-Time Confocal Scanning Optical Microscope", G. L. Report No. 4492, Apr. 1989, presented at the SPIE Symposium on Microlithography, San Josee, Calif., Feb. 26-Mar. 3, 1989.

Primary Examiner—Paul M. Dzierzynski
Assistant Examiner—Thong Nguyen
Attorney, Agent, or Firm—Limbach, Limbach & Sutton

[57] ABSTRACT

An improved real-time confocal scanning microscope, and an improved perforated disk for use in such microscope. A preferred embodiment of the inventive microscope includes a polarizing beamsplitting cube and a rotatable Nipkow disk perforated with a hexagonal hole pattern. The disk is preferably mounted so that the scan lines produced as the disk rotates will cross both the sample feature to be imaged and the sensor array in the system's video camera at an angle substantially equal to 45 degrees. This disk orientation ensures that brightness variations caused by a non-uniform scan will not affect the measurements. Rotation of the disk is preferably synchronized with the camera frame rate to prevent any scan errors from causing random (frame to frame) variations in the camera output. The polarizing beamsplitting cube consists of two triangular prisms connected (i.e., cemented) together by a dielectric film. Undesirable light reflections from the cube's faces are eliminated by orienting the cube about the dielectric film's normal axis so that light is incident at the cube at acute angles with respect to the cube's faces. An absorbing filter (such as a piece of black glass) is preferably optically cemented (or painted or otherwise coated) on the back face of the cube to absorb stray light.

22 Claims, 7 Drawing Sheets

CONFOCAL SCANNING OPTICAL MICROSCOPE

FIELD OF THE INVENTION

The invention is an improved real-time confocal scanning microscope, and an improved perforated disk for use in a confocal scanning microscope.

BACKGROUND OF THE INVENTION

Unlike conventional optical microscopes, confocal scanning optical microscopes (CSOMs) image samples one point at a time through pinholes. A primry advantage of CSOMs is that they have a shallower depth of field than other optical microscopes. Thus, a CSOM is able to resolve both height and width information, and to image (independently) areas of a sample which are separated in height with reduced interference.

T. R. Corle (one of the inventors of the present application), G. Q. Xiao, G. S. Kino, and N. S. Levine, in their paper entitled "Characterization of a Real-time Confocal Scanning Optical Microscope," presented at the SPIE Symposium on Microlithography, San Jose, Calif., Feb. 26-Mar. 3, 1989, describe a CSOM in which light from an arc lamp propagates through a spinning Nipkow disk (a perforated disk through which a large number of holes have been drilled or etched in a spiral pattern). Each illuminated hole of the Nipkow disk produces a spot on the sample to be imaged. Light reflected from the sample propagates back through the disk to an eyepiece.

Many points on the sample are simultaneously illuminated by light through the holes of the Nipkow disk. The sample is scanned as the disk spins and the spinning spiral hole pattern sweeps the illuminated point pattern across the sample. As the disk spins, the system generates a real-time confocal image of the sample.

A conventional real-time confocal scanning microscope is shown in FIG. 1. The system of FIG. 1 includes motor 13, for spinning Nipkow disk 1 about its axis 2. Light from source 3 (which may be an arc lamp or other intense source) is focused by condensor 5 and polarized by polarizer 7, and then propagates through iris 9 and is reflected by partially reflective beamsplitter 11 toward disk 1. Some of the light incident on disk 1 from beamsplitter 11 propagates through the holes in disk 1, through tube lens 15, quarter wave plate 17, and objective lens 19 onto sample 21.

Some of the light reflects from sample 21, and propagates back through lens 19, quarter wave plate 17, lens 15, and the same set of holes in disk 1. The reflected light is then transmitted through partially reflective, partially transmissive beamsplitter 11, secondary objective lens 25 in the aperture of aperture plate 23, and analyzer 27. Polarized light from analyzer 27 reflects from mirror 29 and is incident on eyepiece 31. Alternatively, eyepiece 31 may be replaced by an image recording device such as a CCD camera.

By using the same set of pinholes of disk 1 for illumination and imaging, fewer optical components are required, and the procedure for aligning the system components is simplified.

Axis 2 of disk 1 can be tilted at a nonzero angle with respect to the optical axis 22 of objective lens 19 and sample 21. This diverts unwanted reflections from disk 1, preventing them from reaching eyepiece 31.

Polarizer 7, quarter wave plate 17, and analyzer 27 together function to reduce interference from unwanted reflections from the disk. Analyzer 27 is oriented to transmit polarized radiation that has propagated twice through quarter wave plate 17 (once before reaching sample 21, and once after reflecting from sample 21), and to block radiation that has not propagated twice through quarter wave plate 17.

FIG. 2 is a top view of Nipkow disk 1 of the FIG. 1 system. Pinholes 14, which extend through disk 1, are arranged in spiral pattern. Typical Nipkow disks include on the order of one million pinholes, each 10-30 microns in diameter and spaced 50-200 microns from adjacent pinholes. In early confocal microscopes, the Nipkow disk pinholes were drilled through a thin copper sheet. More recently, Nipkow disks have been formed by etching silicon wafers or using a chrome-glass photomask technique.

The major problem with conventional Nipkow disk based confocal microscopes is that the light signal returned to the detector from the specimen is very small. A conventional Nipkow disk with 30 micron holes spaced 200 microns (center to center) will transmit only 2% of the radiation incident thereon. The other 98% of the radiation is not used, and is reflected in undesirable directions (such as toward the eyepiece). Additional optical loss results each time the light propagates through (or reflects from) the other system components (including the separate polarizer and analyzer components).

Until the present invention, it had not been known how to design Nipkow disk based confocal microscopes so as to increase the total amount of light in the image of the sample, while also reducing background noise.

SUMMARY OF THE INVENTION

The invention is an improved real-time confocal scanning microscope, and an improved perforated disk for use in such microscope. A preferred embodiment of the inventive microscope includes a polarizing beamsplitting cube (to replace all three of the separate polarizer, analyzer, and beamsplitter plates employed in conventional systems), and a rotatable Nipkow disk (perforated with a substantially hexagonal hole pattern) mounted so that the scan lines produced as the disk rotates will cross both the sample's major linear features and the sensor array in the system's video camera at an angle substantially equal to 45 degrees. This disk orientation ensures that brightness variations caused by a non-uniform scan will not affect the image.

Rotation of the Nipkow disk should be synchronized with the camera frame rate to prevent any scan errors from causing random (frame to frame) variations in the camera output. The Nipkow disk is preferably perforated with a plurality of substantially hexagonal hole arrays located in distinct annular portions ("rings") of the disk.

The polarizing beamsplitting cube preferably consists of two triangular prisms connected (i.e., cemented) together by a dielectric film. Undesirable light reflections from the cube's faces are eliminated by orienting the cube about the dielectric film's normal axis so that light is incident with nonzero incidence angle at the cube's faces. Preferably, an absorbing filter (such as a piece of black glass) is optically cemented (or painted or otherwise coated) on the back face of the cube to absorb stray light.

In a first class of embodiments, a secondary objective lens and secondary tube lens are positioned between the eyepiece and the beamsplitting cube to produce a magnified image at the eyepiece. In a second class of embodiments, chromatic and other aberrations present in the first class of embodiments are reduced by positioning the beamsplitting cube in collimated light space between a secondary objective lens and a secondary tube lens. The position of the cube in the second class of embodiments, however, tends to increase unwanted background due to reflections from the top surface of the secondary objective.

DETAILED DESCRIPTION OF THE PREFERRED EMBODIMENT

Figure 3:
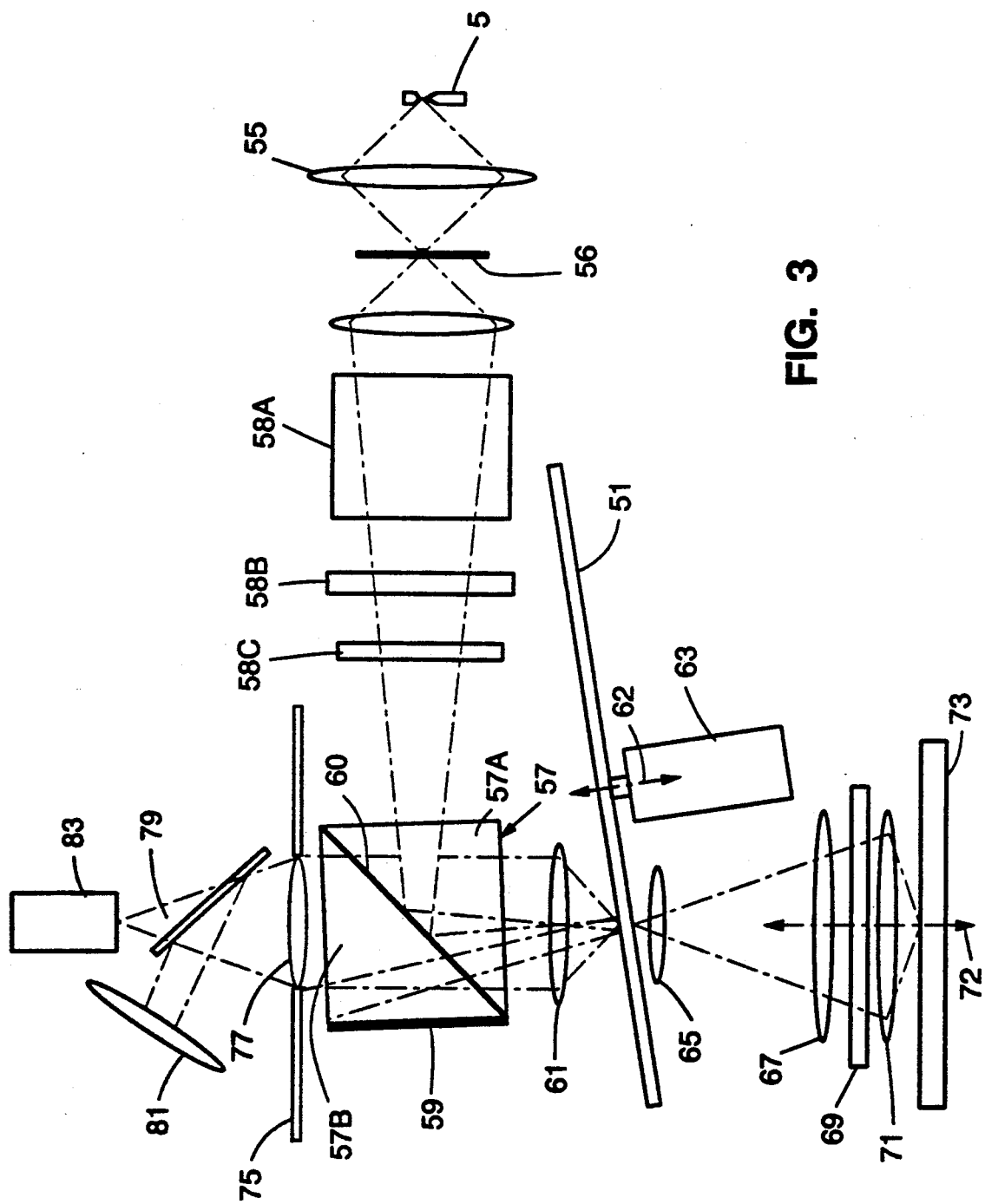
FIG. 3 is a simplified side view of a real-time confocal scanning microscope in accordance with a preferred embodiment of the invention.

In the FIG. 3 embodiment, the invention includes motor 63, for spinning Nipkow disk 51 about disk axis 62. Light from source 53 (which may be an arc lamp or another intense source) is focused by condensor 55 on a pinhole aperture through apertured plate ("iris diaphragm") 56, and then propagates through pre-polarizing cube 58a, neutral density filters 58b, and color filters 58c, to a front face of polarizing beamsplitting cube 57.

In the preferred embodiment of FIG. 3, cube 57 comprises triangular prisms 57a and 57b, and dielectric film interface 60 sandwiched therebetween. Film 60 reflects a first portion of the light from lamp 53 (having a first polarization) toward disk 51. A second portion of the light from lamp 53 (having a second polarization) is transmitted from element 57a through interface 60 into element 57b, and is absorbed by absorbing layer 59. Absorbing layer 59 is preferably a sheet of black glass optically cemented on the back face of element 57b of cube 57, but may alternatively be another absorbent substance painted or otherwise coated on the back face of element 57b. In variations on the FIG. 3 embodiment, absorbing layer 59 is omitted. The function of pre-polarizing element 58a (which may be a polarizing cube) is to block light polarized so that, if not blocked, the light would be transmitted through interface 60 to absorbing layer 59. By blocking such polarized light in element 58a, the power that must be absorbed by layer 59 during operation of the inventive microscope is reduced.

Figure 1:
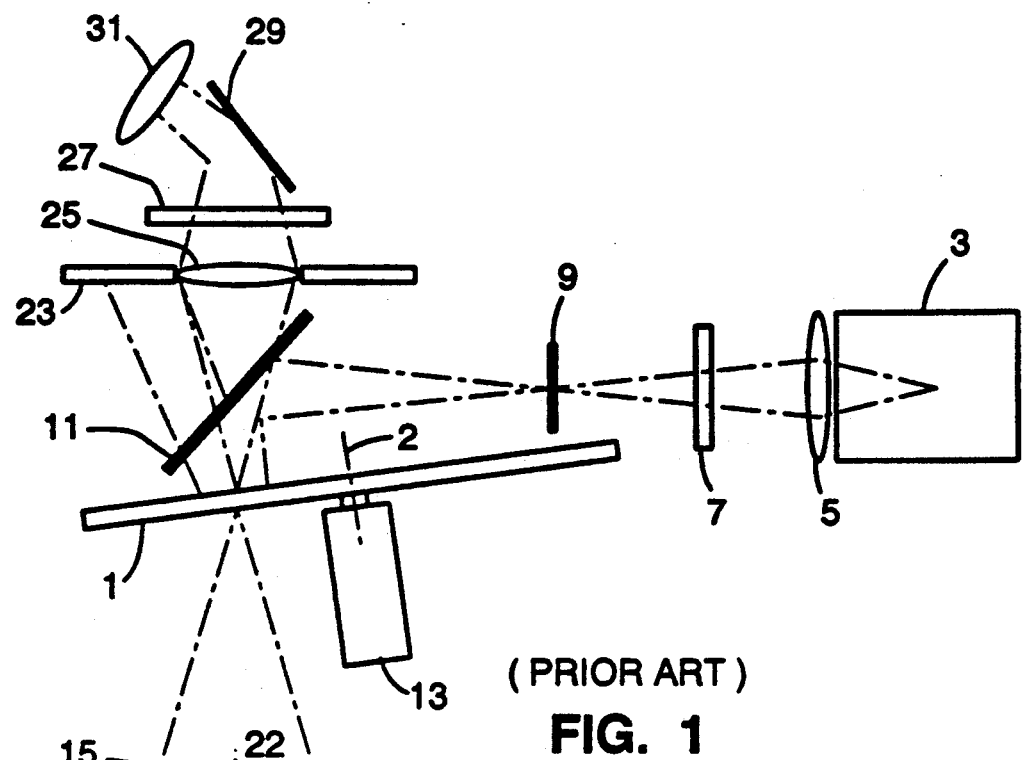
FIG. 1 is a simplified side view of a conventional real-time confocal scanning microscope.
Figure 2:
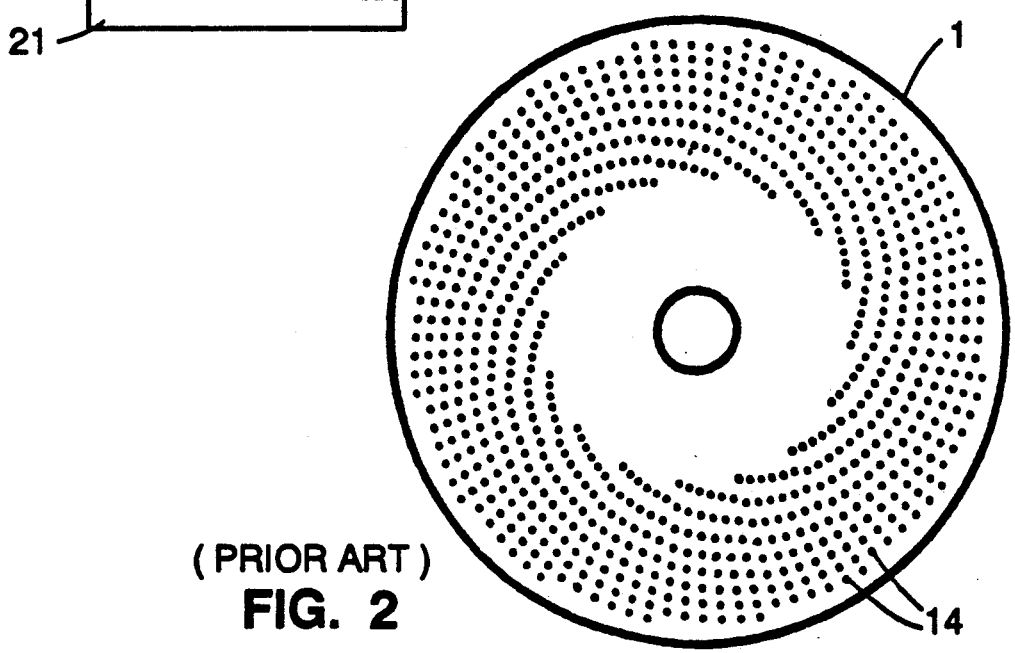
FIG. 2 is a top view of a Nipkow disk of the type employed in the FIG. 1 system.

Use of polarizing beamsplitting cube 57 significantly improves the efficiency of the inventive system in comparison with the FIG. 1 system. This may be appreciated by considering that in the FIG. 1 system, there is a substantial (approximately 50%) reduction in light intensity each time the beam passes through beamsplitting plate 11. Use of polarizing beamsplitting cube 57 eliminates this loss, resulting in 50-87% more light in the final image. Another benefit of using polarizing beamsplitting cube 57 is the elimination of ghost images of the type which result from reflections from the back face of beamsplitting plate 11 in FIG. 1.

Figure 4:
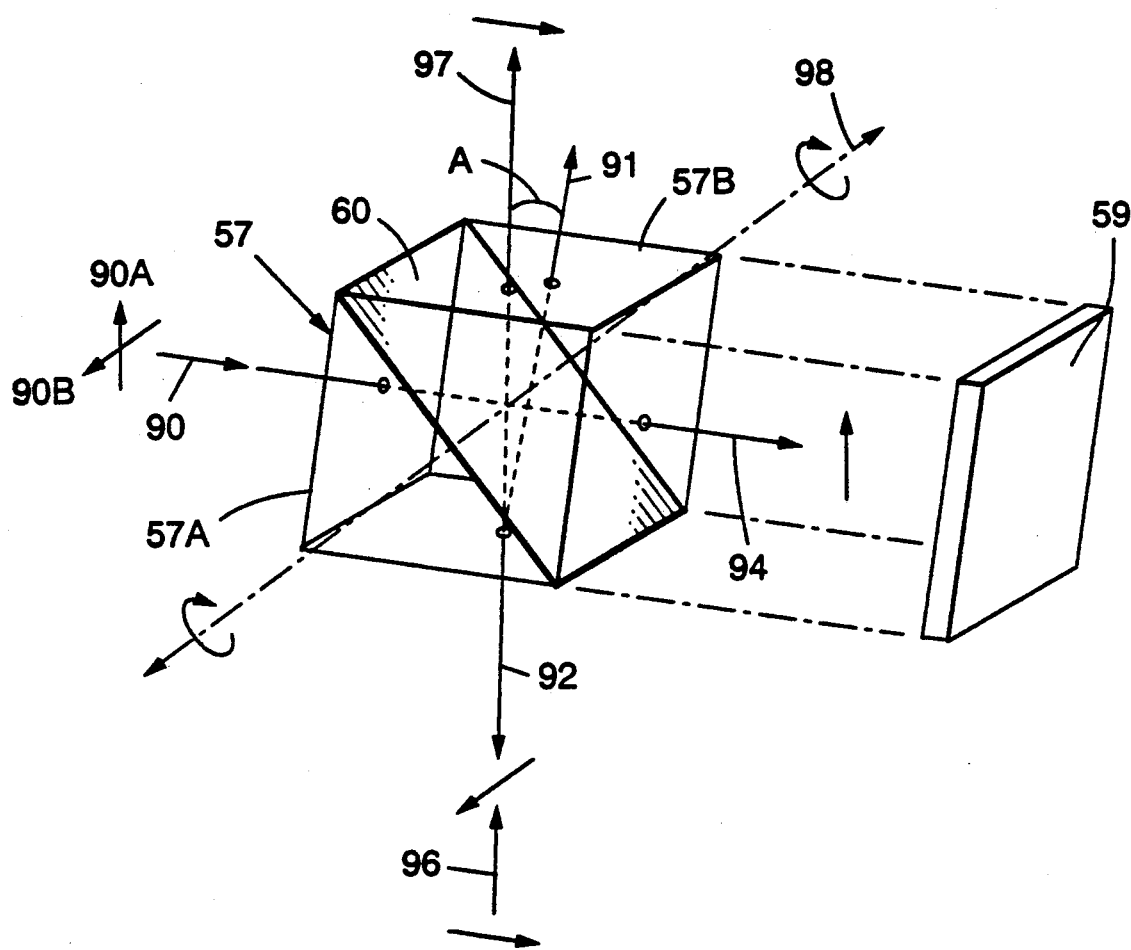
FIG. 4 is a perspective view of the polarizing beamsplitting cube employed in the FIG. 3 embodiment.

As shown in FIG. 4, beam 90 from source 53 will in general include components with different polarizations (having polarization axes 90A and 90B), since pre-polarizing element 58a is imperfect (and may be omitted in some embodiments). Beam 90 is incident at the front face of element 57a, and splits into reflected and transmitted beams 92 and 94 upon reaching film 60 within cube 57. Beam 94, having a first polarization (a vertical linear polarization in FIG. 4), exits cube 57 through back portion 57b and may be absorbed by an absorbing layer 59 coated on (or mounted adjacent to) back portion 57b. Layer 59 is shown in exploded view in FIG. 4 for convenience, but would be adjacent to or coated on the back surface of element 57b in operation of the inventive microscope.

Beam 92, having a second polarization (a horizontal linear polarization in FIG. 4), exits cube 57 through a side face of element 57a and thereafter propagates through secondary objective 61 toward disk 51 (shown in FIG. 3).

Some of the light incident on disk 51 from cube 57 propagates through holes in disk 51, and then through field lens 65, tube lens 67, polarization rotating element 69, and objective lens 71, onto sample 73. Preferably, element 69 is a quarter wave plate. After reflecting from sample 73, light propagates back through lens 71, element 69, lens 67, lens 65, the same set to holes in disk 51, and secondary objective lens 61. After having its polarization rotated by twice propagating through element 69, this light (denoted as beam 96 in FIG. 4) is incident at cube 57. Portion 97 of beam 96 propagates through film 60 and exits cube 57 through a side face of element 57b.

After exiting cube 57, beam 97 propagates through secondary tube lens 77 (mounted in an aperture through aperture plate 75) toward beamsplitter 79. Typically, beamsplitter 79 will be a penta prism, which will not invert the image incident thereon. The portion of beam 97 reflected from beamsplitter 79 reaches eyepiece 81, and the portion transmitted through beamsplitter 79 reaches video camera 83 (which preferably includes a CCD or Vidicon array). In the preferred embodiment shown in FIG. 3, the system's image receiving means includes video camera 83, eyepiece 81, and beamsplitter 79. In alternative embodiments, it should be appreciated that either of camera 83 and eyepiece 81 (and/or beamsplitter 79 may be omitted from the system's image receiving means.

With reference again to FIG. 4, axis 98 is normal to the plane of interface 60, so that rotation of cube 57 about axis 98 will not change the orientation of film 60. In a preferred embodiment, cube 57 is mounted in the inventive microscope at such an orientation about axis 98 that light reflected from the cube's outer faces will not interfere with the imaging of the sample, including reflections of light incident at one of the cube's outer faces from outside the cube, and reflections (such as beam 91) of light incident at one of the cube's outer faces from within the cube. For example, cube 57 is preferably oriented about axis 98 so that beams 90 and 96 are incident at the cube at sufficiently large, nonzero incidence angles, so that reflections of these beams will propagate in directions such that they will not be re-reflected from the microscope components back to cube 57. In such preferred cube orientation, neither the portion of incident beam 90 reflected from element 57a's front face nor the portion of beam 96 reflected from element 57a's side face will interfere with operation of the inventive microscope. In FIG. 4, cube 57 is shown to be oriented about axis 98 so that beam 91 (which is a portion of beam 90 that has reflected from interface 60, then reflected from an outer side face of element 57a, and then propagated through interface 60 and an outer side of element 57b) exits cube 57 at a nonzero angle A with respect to the direction of beam 97.

Axis 62 of disk 51 may be tilted at a nonzero angle with respect to optical axis 72 of objective lens 71 and sample 73, so as to divert a substantial portion of the reflected light from disk 51, thus preventing such reflected light from reaching eyepiece 81 and camera 83. For example, with the axis of disk 51 tilted at five degrees with respect to axis 72 as shown in FIG. 3, reflections from disk 51's upper surface will strike aperture plate 75 (instead of propagating upward to the eyepiece and tube lens).

Figure 9:
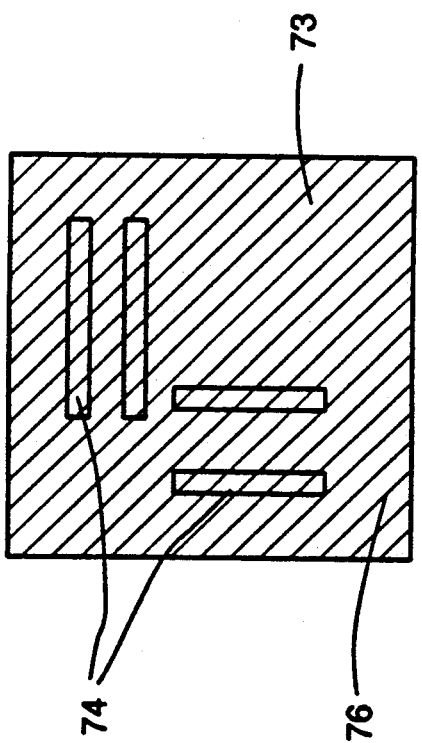
FIG. 9 is an image of a sample obtained in accordance with the invention, showing elongated features of the sample and scan lines across the sample.

As Nipkow disk 51 rotates, the spiral pattern of pinholes scans the entire field of view. Any defects in the disk (such as dirt on the disk, a scratch or small hole on the disk, fluctuating motor speed, or off-center mounting of the disk) will cause scan lines in the image at eyepiece 81 and camera 83. These scan lines will appear as bright or dark lines running in the same direction as the motor rotation. An example of such scan lines are lines 76 in the sample image shown in FIG. 9 (to be discussed below). If a scan line were to occur at the edge of a sample feature being measured (i.e., one of elongated sample features 74), an incorrect result would be obtained.

Figure 10:
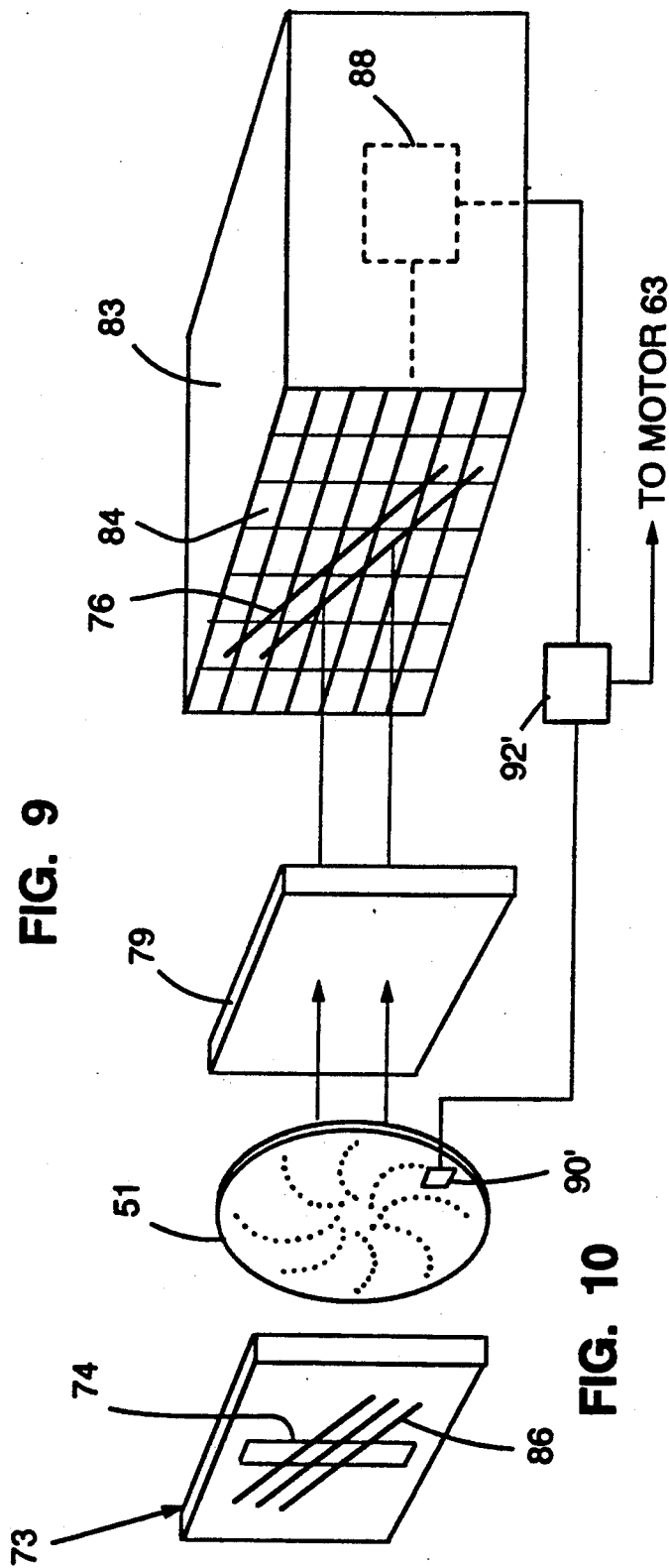
FIG. 10 is a simplified perspective view of a portion of the FIG. 3 system.

For this reason (as shown in FIG. 10), disk 51 should be mounted so that the path of scanning beam 86, projected on sample 73 as the disk rotates, will intersect major linear features 74 of the sample at an angle substantially equal to forty-five degrees. Also (as shown in FIG. 10), disk 51 and video camera 83 should be mounted in an orientation so that scan lines 76 (reflections of scanning beam 86 projected on the camera) will intersect the rectangular grid defined by video camera 83's sensor array 84 (which may be a CCD or Vidicon array) at an angle substantially equal to forty-five degrees. This orientation will ensure that brightness variations caused by a non-uniform scan will not affect the measurements.

Another technique for reducing problems with spurious scan lines is to synchronize rotation of disk 51 with the frame rate of camera 83. This will prevent scan errors from causing random (frame to frame) variations in the camera output. Such synchronization can be accomplished by employing an electronic circuit 92' (shown in FIG. 10) to compare a signal from an encoder 90' (shown in FIG. 10) attached to disk 51 (or to motor 63), with the line or frame sync pulse employed in camera 83's read-out means 88 (shown in FIG. 10) to read out the camera's sensor array 84. An error signal is generated (as the result of such comparison) for use as a feedback control signal for motor 63.

Cube 57 and element 69 function together to reduce interference from unwanted reflections from disk 51, in the following manner. Cube elements 57a and 57b are oriented to transmit polarized radiation that has propagated twice through element 69, but to block radiation that has exited the side face of element 57a and reflected back to that side face from disk 51.

The position of the beamsplitting cube in collimated space between secondary objective and tube lenses 61 and 77 in FIG. 3 substantially reduces the chromatic aberrations that are present in embodiments in which the beamsplitting cube is positioned between the Nipkow disk and both the secondary objective and secondary tube lens. Such chromatic aberration is particularly severe in embodiments in which the beamsplitting cube is tilted, as shown in FIG. 4.

The FIG. 5 embodiment differs from the FIG. 3 embodiment in several respects to be described below. In all other respects, it includes components corresponding to (and identified by the same reference numerals as) those in FIG. 3.

Figure 5:
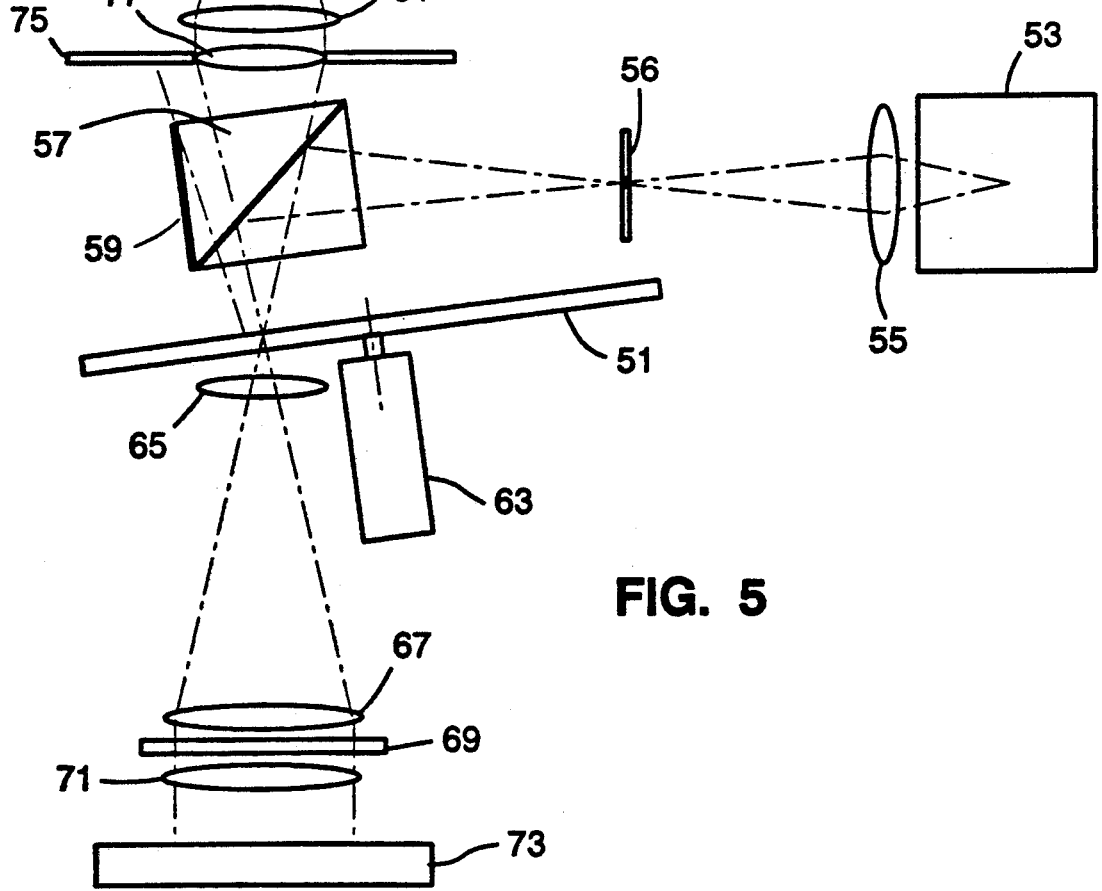
FIG. 5 is a simplified side view of a real-time confocal scanning microscope in accordance with an alternative embodiment of the invention.

In FIG. 5, light from source 53 is focused onto small iris diaphragm 56 by condensor 55 and then propagates to a front face of polarizing beamsplitting cube 57. Iris 56 functions as a small source for illumination of disk 51. In variations on the FIG. 5 embodiment, alternative components for providing a point (or small) source of illumination can be employed. However, if an extended source is employed, the resolution of the microscope will decrease.

In FIG. 5, some of the light incident on disk 51 from polarizing beamsplitting cube 57 propagates through holes in the disk, and then through field lens 65, tube lens 67, polarization rotating element 69 (which is preferably a quarter wave plate), and objective lens 71, onto sample 73. After reflecting from sample 73, light propagates back through lens 71, element 69, lens 67, lens 65, the same set of holes in disk 51, polarizing beamsplitting cube 57, lens 77 mounted in aperture plate 75, and lens 91', to beamsplitting plate 79.

Lens 77 and lens 91' function respectively as a secondary objective and a secondary tube lens, to produce a magnified image of the sample. Since both lens 77 and lens 91' are positioned adjacent the face of cube 57 opposite disk 51, there is less noise in the FIG. 5 configuration due to reflections from the secondary objective than in the FIG. 3 configuration. The system will compensate for chromatic aberration (especially that which results from tilted orientation of cube 57) if lens 77 and lens 91' are specially designed to embody the appropriate optical corrections.

Figure 6A:
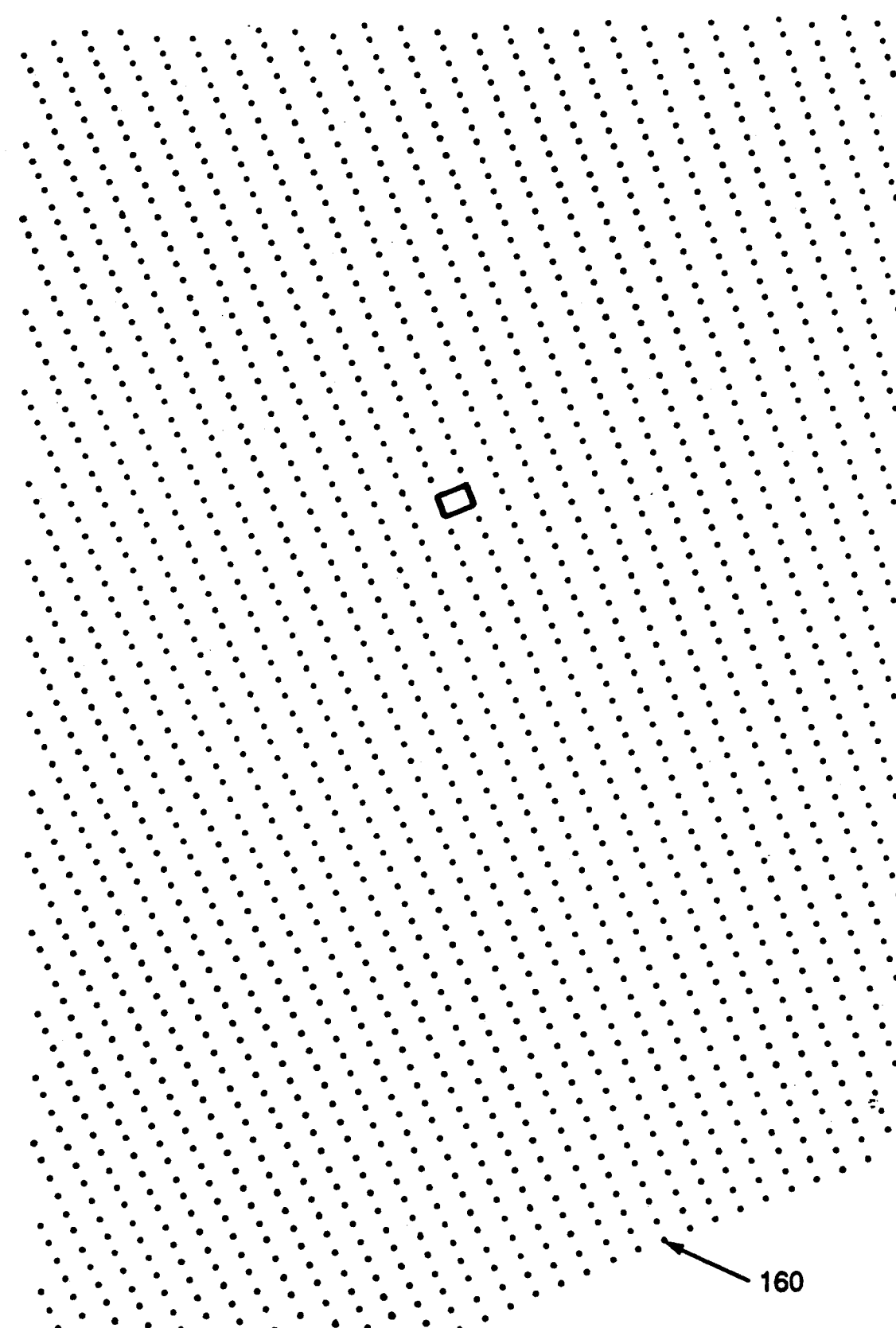
FIG. 6A is an enlarged top view of a portion of a conventional Nipkow disk.

FIG. 6A is an enlarged top view of a portion of a conventional Nipkow disk, with an array of holes 160. Hole array 160 is rectangular (or "rectangularly packed") in the sense that a hole in the array has four holes adjacent thereto. These four adjacent holes define a rectangle enclosing the hole. Hole array 160, while rectangularly packed, also defines a spiral pattern suitable for scanning a sample as the disk rotates.

Figure 6B:
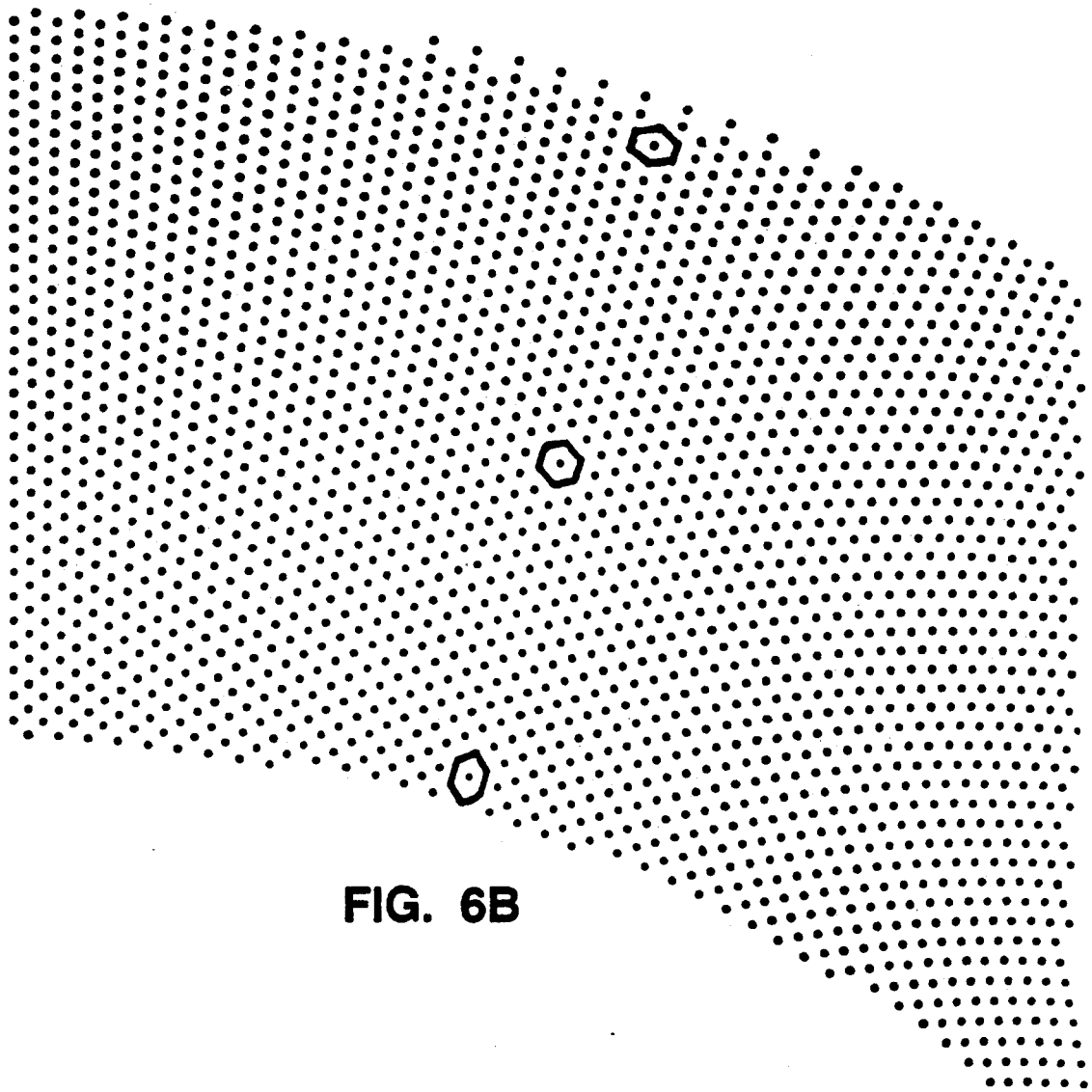
FIG. 6B is an enlarged top view of a portion of an improved Nipkow disk embodying the invention.

FIG. 6B is an enlarged partial top view of the inventive improved Nipkow disk 51, showing a portion of an annular hole array in the disk's surface. The holes are arranged in a substantially hexagonal array (i.e., they are packed substantially hexagonally), in the sense that a hole in the array has six holes adjacent thereto. These six adjacent holes define a hexagon enclosing the hole.

The phrase "substantially hexagonal array" herein refers to both hole patterns that are exactly hexagonal, and to hole patterns that are generally hexagonal but vary sufficiently with radial distance from the disk center (as shown in FIG. 6B) to keep the disk transmission substantially independent of radial distance from the disk center.

The hole array of FIG. 6B, while hexagonally packed, also defines a spiral pattern suitable for scanning a sample as the disk rotates. A hexagonal array of holes is superior to a rectangular array of holes, since the former allows a higher hole density to be obtained for a given center-to-center hole spacing. Since one factor in determining the brightness of the microscope image is the center-to-center hole spacing, a hexagonal hole array allows more light to be transmitted through the system without decreasing the resolution of the microscope.

By changing the size of the holes in the hole array of the inventive Nipkow disk, we are able to modify the depth response of the microscope so that it is most suited to the sample being measured. For very thin highly reflecting samples, small holes should be used because they generate the narrowest depth response. The narrow depth response enables us to independently image the top and bottom of a thin sample. The disadvantage of using small holes is that they do not transmit much light. Weakly reflecting samples therefore require larger holes so that enough light is received by the camera to frm an image. Using larger pinholes, however, generates a wider depth response.

An equivalent effect can be achieved by changing the magnification of the objective lens. A high magnification objective will have a narrower depth response than a low magnification objective with the same numerical aperture. The reason is that the high magnification lens will, in general, have a smaller pupil than a low magnification lens. A small lens pupil will be more uniformly illuminated by the diffraction patterns of the pinholes than a larger one. A narrower depth response is thus obtained. It is preferable to modify the depth response of the inventive microscope by employing a disk having multiple hole patterns (to be discussed below with reference to FIG. 7) and moving the disk to a different pattern, rather than by switching objectives, because replicating patterns on a Nipkow disk is less expensive than buying extra objectives for each microscope.

The inventive Nipkow disk may include two or more hexagonal arrays of holes located in distinct annular portions (or "bands") of the disk. The holes in each band will preferably be hexagonally packed, and the overall pattern of holes should define a spiral pattern suitable for scanning a sample as the disk rotates about its center. For example, in FIG. 7, Nipkow disk 171 includes five annular bands 173, 174, 175, 176, and 177 of holes. For convenience, the holes in radially innermost band 173 (the band nearest central mounting aperture 179) have the smallest center-to-center spacing, and the spacing of the holes in the other bands increases with radial distance from center 181 of aperture 179. By including multiple bands of holes, the inventive disk allows the user readily to adjust the imaging properties of a single microscope lens by shifting to a different hole array. The inventive microscope may thus be conveniently tailored to the sample, by translating the disk/motor assembly to expose a different band of holes to the beam, while keeping the other microscope components fixed.

In one preferred embodiment, the holes comprising arrays 173-177 define thirty-two spirals, and each hole is a ten-sided polygon. In this embodiment, the size (diameter) of each hole, the center-to-center spacing between adjacent holes, and the inner and outer diameter of the annular band occupied by each array, are specified in Table 1:

TABLE 1

| ARRAY | HOLE SIZE | HOLE SPACING | ANNULUS | |
|---|---|---|---|---|
| | | | INNER DIA. | OUTER DIA. |
| 173 | 10.0 micron | 45.5 micron | 55.0 mm | 66.5 mm |
| 174 | 15.0 micron | 45.5 micron | 67.0 mm | 78.5 mm |
| 175 | 12.5 micron | 53.0 micron | 79.0 mm | 90.5 mm |
| 176 | 10.0 micron | 60.5 micron | 91.0 mm | 102.5 mm |
| 177 | 15.0 micron | 60.5 micron | 103.0 mm | 114.5 mm |

Figure 7:
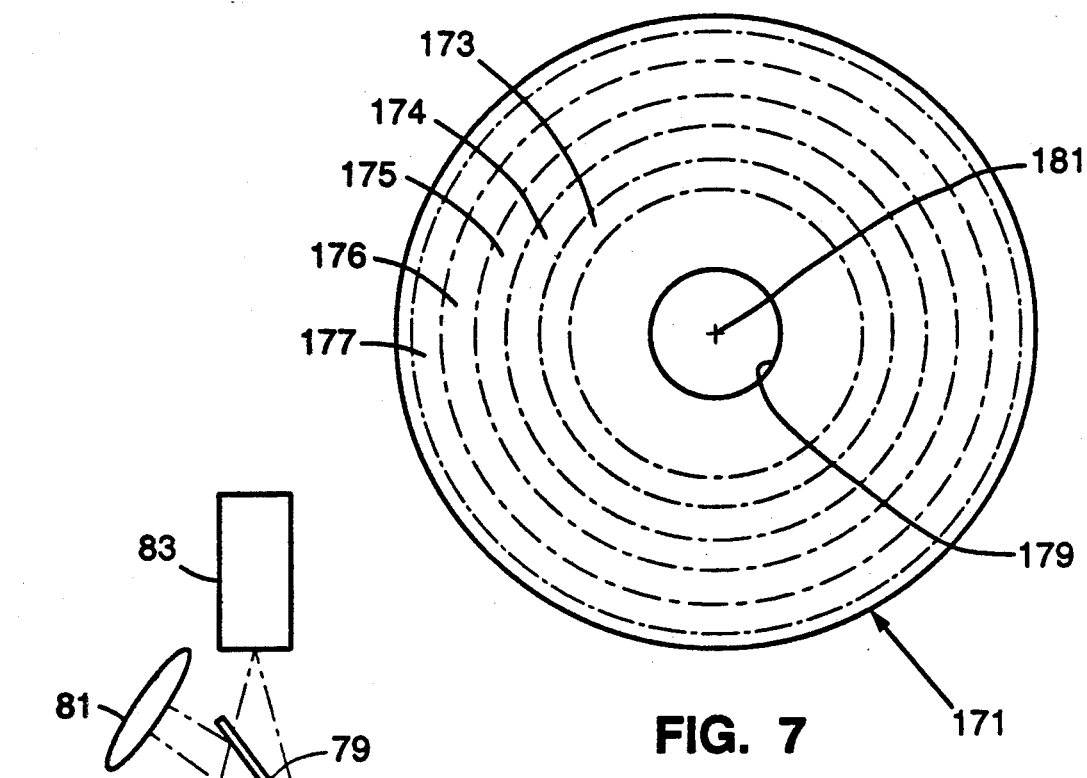
FIG. 7 is a simplified top view of an improved Nipkow disk embodying the invention.

In another preferred embodiment including five hole arrays as shown in FIG. 7, the size (average diameter) of each hole, the center-to-center spacing between adjacent holes, and the inner and outer diameter of the annulus occupied by each array, are specified in Table 2:

TABLE 2

| ARRAY | HOLE SIZE | HOLE SPACING | ANNULUS | |
|---|---|---|---|---|
| | | | INNER DIA. | OUTER DIA. |
| 173 | 12.5 micron | 42.5 micron | 55.0 mm | 66.5 mm |
| 174 | 9.0 micron | 53.0 micron | 67.0 mm | 78.5 mm |
| 175 | 12.5 micron | 53.0 micron | 79.0 mm | 90.5 mm |
| 176 | 16.0 micron | 53.0 micron | 91.0 mm | 102.5 mm |
| 177 | 12.5 micron | 63.5 micron | 103.0 mm | 114.5 mm |

Although five annular arrays of holes are shown in FIG. 7, it is contemplated that other embodiments of the invention may include less than five or more than five annular arrays of holes.

Another advantage of having multiple bands on the disk is that the center-to-center hole spacing can be adjusted for a given hole size. Decreasing the center-to-center spacing (i.e., moving the holes closer together) will increase the total amount of light transmitted by the system, enabling weakly reflecting samples to be imaged. The transverse resolution will however decrease. Again, the design trade-off is light vs. resolution. Having a disk with multiple bands allows us to adjust both the hole size and hole spacing so that the imaging characteristics of the microscope can be conveniently and cheaply optimized for the sample being observed.

Figure 8:
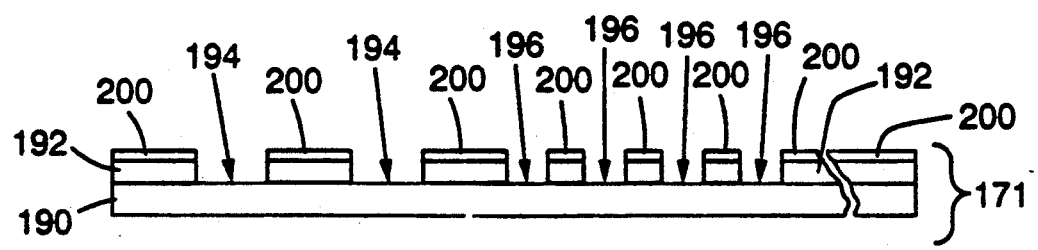
FIG. 8 is a simplified side cross-sectional view of a portion of the Nipkow disk of FIG. 7.

It should be appreciated that the holes in the inventive Nipkow disk may, but need not, extend completely through the disk. In the embodiment of FIGS. 7 and 8, Nipkow disk 171 comprises a transparent substrate 190 coated by an opaque layer 192. As shown in FIG. 8, portions of opaque layer 192 are etched away to define holes 194 (which belong to array 177) and holes 196 (which belong to array 176). Holes 194 have a larger center-to-center spacing than do holes 196, consistent with Tables 1 and 2. Typically, layer 192 will be low-reflectivity black chrome. We prefer that layer 192 produce mirror-like (specular) reflections from the regions thereof between the holes.

The holes in each embodiment of the inventive disk are referred to herein as "perforating" the disk, even though solid transparent material (rather than air) fills each hole in some embodiments.

The holes in the inventive Nipkow disk are preferably formed by etching an opaque coating on a chrome glass photomask using standard lithographic techniques. The individual holes may have any of a variety of shapes (such as, for example, a rectangular shape or a hexagonal shape). In some embodiments, it will be less expensive to manufacture hexagonal holes than circular holes or polygonal holes with more than six sides.

Preferably, opaque layer 192 (shown in FIG. 8) is sufficiently thick to prevent significant transmission of light through the areas surrounding the holes. In an embodiment in which layer 192 is a black chrome layer, we prefer that layer 192 have a thickness of at least 2000 Angstroms, to achieve an optical transmission of less than 0.01% (so that less than 0.01% of the incident optical radiation is transmitted through the chrome layer). In contrast, conventional chrome glass photomasks have thickness in the range from 700 to 1000 Angstroms. than on the order of 0.01 percent of the optical radiation incident thereon, because we have recognized that if the opaque layer transmits on the order of 0.1 percent of the optical radiation incident thereon, the amount of image degradation becomes unacceptably large for most applications.

We prefer that an anti-reflection coating be applied to each glass optical component of the inventive microscope. It is also useful to anti-reflection coat the top chrome surface of the Nipkow disk. Thus, in the FIG. 8 embodiment for example, we prefer that anti-reflection coating 200 be applied on opaque layer 192.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A microscope for imaging a sample, including:
   a polarization rotating element positioned adjacent the sample;
   a rotatably mounted disk, perforated with an array of holes;
   a polarizing beamsplitting cube including a partially reflective film having a normal axis, wherein the cube is positioned to receive a beam of light from a source and divert a first portion of the beam having a first polarization through the disk to the polarization rotating element; and
   an image receiving means positioned to receive a second portion of the first portion of the beam, wherein said second portion has propagated through the polarization rotating element and reflected from the sample to the image receiving means back through the polarization rotating element, the disk, and the cube, wherein the cube is mounted within the microscope in such an orientation about the normal axis that the beam is incident at the cube at a nonzero incidence angle, and wherein the nonzero incidence angle is sufficiently large that reflections of the beam from outer surfaces of the cube will not interfere with the second portion.

2. The microscope of claim 1, wherein the image receiving means is a video camera, wherein the video camera has a sensor array and a means for reading out the sensor array at a frame rate, also including:
   means for synchronizing rotation of the disk with the frame rate.

3. The microscope of claim 1, wherein the cube has a front face which faces the source and a back face, and also including:
   an absorbing filter coated on the back face of the cube to absorb stray light.

4. The microscope of claim 3, wherein the absorbing filter is black glass optically cemented on the back face.

5. The microscope of claim 1, also including:
   a secondary tube lens positioned between the image receiving means and the cube; and
   a secondary objective lens positioned between the cube and the disk.

6. The microscope of claim 1, wherein the array of holes is substantially hexagonal array of holes.

7. The microscope of claim 1, wherein the disk defines a first array of holes and a second array of holes, wherein the holes in the first array have a first size, the holes in the second array have a second size, and the holes in the first array and the holes in the second array are located in distinct annular portions of the disk.

8. The microscope of claim 7, wherein the holes in the first array have different average center-to-center spacing than do the holes in the second array.

9. The microscope of claim 1, wherein the partially reflective film is a dielectric film, and wherein the cube includes two triangular prisms connected together by the partially reflective film.

10. A microscope, including:
    a sample having major linear features;
    a polarization rotating element positioned adjacent the sample;
    a rotatably mounted disk, perforated with a substantially hexagonal array of holes;
    a polarizing beamsplitting cube, wherein the cube is positioned to receive a beam of light from a light source and divert a first portion of the beam having a first polarization through a region of the disk to the polarization rotating element; and
    an image receiving means positioned to receive a second portion of the first portion, wherein said second portion has propagated through the polarization rotating element and reflected from the sample to the image receiving means back through the polarization rotating element, the region of the disk, and the cube, wherein a first hole of the array of holes perforates the region of the disk, and wherein the disk is mounted in such a position, in relation to the sample, that a projection on the sample of a disk radius through the first hole intersects the major linear features at an angle substantially equal to 45 degrees, so that a projection of the first portion of the beam on the sample through the first hole as the disk rotates defines scan line on the sample which intersects the major linear features at an angle substantially equal to 45 degrees.

11. The microscope of claim 10, wherein the image receiving means is a video camera, wherein the video camera has a sensor array and a means for reading out the sensor array at a frame rate, also including:
    means for synchronizing rotation of the disk with the frame rate.

12. The microscope of claim 10, wherein the cube has a front face which faces the source and a back face, and also including:
    an absorbing filter coated on the back face of the cube to absorb stray light.

13. The microscope of claim 12, wherein the absorbing filter is black glass optically cemented on the back face.

14. The microscope of claim 10, also including:
a secondary tube lens positioned between the image receiving means and the cube; and
a secondary objective lens positioned between the cube and the disk.

15. The microscope of claim 10, wherein the image receiving means includes a sensor array defining a rectangular grid, wherein the disk is mounted in such a position that reflections of the scan line are projected on the sensor array as the disk rotates, and wherein the reflections of the scan line intersect the rectangular grid at an angle substantially equal to 45 degrees.

16. The microscope of claim 10, wherein the disk defines a first array of holes and a second array of holes, wherein the holes in the first array have a first center-to-center spacing, the holes in the second array have a second center-to-center spacing, and the holes in the first array and the holes in the second array are located in distinct annular portions of the disk.

17. The microscope of claim 10, wherein the cube includes two triangular prisms having outer surfaces and a partially reflective film between the prisms, wherein the partially reflective film has a normal axis, wherein the cube is mounted within the microscope in such an orientation about the normal axis that the beam is incident at the cube at a nonzero incidence angle, and wherein the nonzero incidence angle is sufficiently large that reflections of the beam from the outer surfaces will not interfere with the second portion.

18. A disk for use in a confocal scanning microscope, wherein the disk is perforated with a first array of holes and a second array of holes, wherein the holes in the first array and the holes in the second array are located in distinct annular portions of the disk, wherein the holes in the first array have a first center-to-center spacing and the holes in the second array have a second center-to-center spacing, and wherein the holes define a spiral pattern suitable for scanning a sample as the disk rotates.

19. The disk of claim 18, wherein the holes are arranged in a substantially hexagonal array pattern.

20. The disk of claim 18, wherein the holes in the first array have different size than do the holes in the second array.

21. The disk of claim 18, wherein the disk includes:
a transparent substrate;
an opaque layer on a first portion of the substrate, wherein the first portion excludes regions which define the first array of holes and the second array of holes; and
an anti-reflection coating on the opaque layer.

22. A disk for use in a confocal scanning microscope, including;
a transparent substrate; and
an opaque layer on the substrate, wherein the layer transmits less than 0.01 percent of optical radiation incident thereon, and wherein portions of the layer have been removed to define an array of holes arranged in a spiral pattern suitable for scanning a sample as the disk rotates, wherein the holes are arranged into a first array of holes and a second array of holes, wherein the holes in the first array and the holes in the second array are located in distinct annular portions of the disk, and wherein the holes in the first array have a first center-to-center spacing and the holes in the second array have a second center-to-center spacing.

* * * * *